United States Patent
Tanaka et al.

(10) Patent No.: US 12,258,498 B2
(45) Date of Patent: *Mar. 25, 2025

(54) ADHESIVE SET, ADHESIVE BODY, AND MANUFACTURING METHOD THEREFOR

(71) Applicant: Resonac Corporation, Tokyo (JP)

(72) Inventors: Toru Tanaka, Tokyo (JP); Takashi Kawamori, Tokyo (JP); Masahiro Matsunaga, Tokyo (JP); Yosuke Fujiyasu, Tokyo (JP)

( * ) Notice: Subject to any disclaimer, the term of this patent is extended or adjusted under 35 U.S.C. 154(b) by 239 days.

This patent is subject to a terminal disclaimer.

(21) Appl. No.: 17/999,865

(22) PCT Filed: Nov. 17, 2020

(86) PCT No.: PCT/JP2020/042819
§ 371 (c)(1),
(2) Date: Nov. 25, 2022

(87) PCT Pub. No.: WO2022/107210
PCT Pub. Date: May 27, 2022

(65) Prior Publication Data
US 2023/0212430 A1 Jul. 6, 2023

(51) Int. Cl.
*B29C 65/48* (2006.01)
*B32B 7/12* (2006.01)
*B32B 37/12* (2006.01)
*C09J 4/00* (2006.01)
*C09J 11/04* (2006.01)
*C09J 11/06* (2006.01)
*C09J 133/08* (2006.01)
*C09J 133/10* (2006.01)
*C09J 133/12* (2006.01)

(52) U.S. Cl.
CPC .............. *C09J 4/00* (2013.01); *B29C 65/485* (2013.01); *B32B 7/12* (2013.01); *C09J 11/04* (2013.01); *C09J 11/06* (2013.01); *C09J 133/08* (2013.01); *C09J 133/10* (2013.01); *C09J 133/12* (2013.01); *B32B 2037/1269* (2013.01); *C08F 2438/01* (2013.01); *C09J 2301/408* (2020.08)

(58) Field of Classification Search
CPC . B29C 65/483; B29C 65/4835; B29C 65/485; B32B 7/12; B32B 2037/1253; B32B 2037/1269; C08F 4/52; C08F 220/00; C08F 220/02; C08F 220/10; C08F 220/12; C08F 220/16; C08F 220/18; C08F 220/1811; C08F 2438/01; C08F 2438/03; C08K 5/36; C08K 5/38; C09J 4/00; C09J 11/04; C09J 11/06; C09J 133/08; C09J 133/10; C09J 133/12; C09J 2301/408; C09J 2423/006
See application file for complete search history.

(56) References Cited

U.S. PATENT DOCUMENTS

| | | | | |
|---|---|---|---|---|
| 5,106,928 A * | 4/1992 | Skoultchi | ............... | C09J 4/00 526/196 |
| 5,795,657 A * | 8/1998 | Pocius | ............... | B32B 7/12 428/516 |
| 7,534,843 B2 * | 5/2009 | Jialanella | ............... | C08F 4/52 526/236 |
| 8,742,050 B2 * | 6/2014 | Wang | ............... | C08G 18/10 528/7 |
| 9,018,326 B2 * | 4/2015 | Xie | ............... | C09J 4/00 526/204 |
| 2003/0195318 A1 | 10/2003 | Moren | | |
| 2015/0005442 A1 * | 1/2015 | Nabuurs | ............... | C08L 75/04 526/263 |
| 2016/0347975 A1 | 12/2016 | Irie | | |
| 2018/0237590 A1 | 8/2018 | Clough et al. | | |
| 2020/0339713 A1 | 10/2020 | Magenau et al. | | |
| 2023/0212439 A1 * | 7/2023 | Tanaka | ............... | C09J 4/06 523/201 |

FOREIGN PATENT DOCUMENTS

| | | |
|---|---|---|
| CA | 2183873 | 8/1995 |
| CN | 1610731 | 4/2005 |
| CN | 1898082 | 1/2007 |
| CN | 101174089 | 5/2008 |
| CN | 103160237 | 6/2013 |
| CN | 104204007 | 12/2014 |
| CN | 107001861 | 8/2017 |
| CN | 107429143 | 12/2017 |
| CN | 108026276 | 5/2018 |
| JP | 2005-514489 | 5/2005 |
| JP | 2013-144792 | 7/2013 |
| JP | 2016-047901 | 4/2016 |

(Continued)

OTHER PUBLICATIONS

International Preliminary Report on Patentability with Written Opinion dated Jun. 1, 2023 for PCT/JP2020/042819.
International Preliminary Report on Patentability with Written Opinion dated Jun. 1, 2023 for PCT/JP2020/042820.
International Preliminary Report on Patentability with Written Opinion dated Jun. 1, 2023 for PCT/JP2021/041958.
Extended Search Report in corresponding European Application No. 21894603.6, dated Nov. 6, 2023.

(Continued)

*Primary Examiner* — Michael A Tolin
(74) *Attorney, Agent, or Firm* — SOEI PATENT & LAW FIRM

(57) ABSTRACT

An adhesive set includes a main agent containing a decomplexing agent and an initiator containing an organoborane complex. At least one of the main agent and the initiator further contains a compound having a radically polymerizable group. At least one of the main agent and the initiator further contains a compound having a thiocarbonylthio structure.

9 Claims, No Drawings

(56) References Cited

FOREIGN PATENT DOCUMENTS

| | | |
|---|---|---|
| JP | 2017-141438 | 8/2017 |
| JP | 2018-502939 | 2/2018 |
| JP | 2018-530645 | 10/2018 |
| KR | 10-2018-0042434 | 4/2018 |
| WO | 2010/147011 | 12/2010 |
| WO | 2016/077166 | 5/2016 |
| WO | 2016/171253 | 10/2016 |

OTHER PUBLICATIONS

Extended Search Report in corresponding European Application No. 20962374.3, dated Jul. 6, 2023.
International Search Report dated Jan. 12, 2021 for PCT/JP2020/042819.
International Search Report dated Dec. 21, 2021 for PCT/JP2021/041958.
International Search Report dated Jan. 12, 2021 for PCT/JP2020/042820.
Soei Patent and Law Firm, Statement of Related Matters, dated Jan. 20, 2023.

* cited by examiner

ADHESIVE SET, ADHESIVE BODY, AND MANUFACTURING METHOD THEREFOR

CROSS-REFERENCE TO RELATED APPLICATIONS

This application is a 35 U.S.C. § 371 national phase application of PCT/JP2020/042819, filed on Nov. 17, 2020.

TECHNICAL FIELD

The present disclosure relates to an adhesive set, an adhesive body, and a manufacturing method therefor.

BACKGROUND ART

An adhesive composition containing an organoborane complex has been disclosed as an adhesive for plastics such as polyethylene and polypropylene (for example, Patent Literature 1). The organoborane complex is decomplexed by mixing with a decomplexing agent to provide organoborane. The organoborane acts as an initiator generating radicals by reaction with oxygen. A borinate radical generated here acts as a dormant species of atom transfer radical polymerization (ATRP) that continues growth reaction including surface grafting while suppressing chain transfer or termination reaction of a compound having a radically polymerizable group.

CITATION LIST

Patent Literature

Patent Literature 1: JP 2005-514489 A

SUMMARY OF INVENTION

Technical Problem

In the adhesive composition containing an organoborane complex, it has been studied that an adhesive strength is improved by adding a polymerization control agent such as a halogenated metal salt. It is inferred that, by adding such a polymerization control agent, the polymerization control agent acts as an additional dormant species of ATRP to compensate for the shortfall in the dormant species, the growth reaction of the compound having a radically polymerizable group is accelerated, and as a result, the effect of improving an adhesive strength is produced.

However, the polymerization control agent applied to the adhesive composition containing an organoborane complex is limited to a halogenated metal salt such as $CuBr_2$. Therefore, there are problems such as degradation in reliability due to a metal ion or a halide ion derived from the halogenated metal salt and difficulty in dealing with non-halogenation (halogen-free).

In this regard, a main object of the present disclosure is to provide an adhesive set which enables an adhesive composition excellent in an adhesive strength to be prepared without use of a halogenated metal salt.

Solution to Problem

The inventors of the present disclosure have conducted studies to solve the above-described problems, and as a result, have found that, by using a compound having a thiocarbonylthio structure instead of a halogenated metal salt, a sufficient adhesive strength is produced, thereby completing the invention of the present disclosure.

An aspect of the present disclosure relates to an adhesive set. This adhesive set includes a main agent containing a decomplexing agent and an initiator containing an organoborane complex. At least one of the main agent and the initiator further contains a compound having a radically polymerizable group. At least one of the main agent and the initiator further contains a compound having a thiocarbonylthio structure. According to such an adhesive set, by mixing the main agent and the initiator, an adhesive composition excellent in an adhesive strength can be prepared. The reason why such an effect is produced is inferred that the compound having a thiocarbonylthio structure efficiently acts as a dormant species of ATRP. Therefore, the adhesive set according to the aspect of the present disclosure enables degradation in reliability due to a metal ion or a halide ion to be avoided and non-halogenation (halogen-free) to be achieved.

The main agent may contain a compound having a thiocarbonylthio structure.

Another aspect of the present disclosure relates to an adhesive body. This adhesive body includes a first adherend, a second adherend, and an adhesive layer bonding the first adherend and the second adherend to each other. The adhesive layer contains a cured product of an adhesive composition containing the main agent and the initiator of the above-described adhesive set.

Still another aspect of the present disclosure relates to a method for manufacturing the adhesive body. This method for manufacturing the adhesive body includes pasting the first adherend and the second adherend together with the adhesive composition containing the main agent and the initiator.

Advantageous Effects of Invention

According to the present disclosure, there is provided an adhesive set which enables an adhesive composition excellent in an adhesive strength to be prepared without use of a halogenated metal salt. Furthermore, according to the present disclosure, there are provided an adhesive body and a manufacturing method therefor which use such an adhesive set.

DESCRIPTION OF EMBODIMENTS

Hereinafter, embodiments of the present disclosure will be described. However, the present disclosure is not limited to the following embodiments.

The same applies to numerical values and ranges thereof in the present disclosure, and does not limit the present disclosure. In the present specification, a numerical range that has been indicated by use of "to" indicates the range that includes the numerical values which are described before and after "to", as the minimum value and the maximum value, respectively. In the numerical ranges that are described stepwise in the present specification, the upper limit value or the lower limit value described in a numerical range may be replaced with the upper limit value or the lower limit value in another numerical range that is described stepwise. Furthermore, in a numerical range described in the present specification, the upper limit value or lower limit value of the numerical range may be substituted by a value disclosed in the Examples.

In the present specification, the term "(meth)acrylate" means acrylate or methacrylate corresponding thereto. The same applies to other analogous expressions such as a (meth)acryloyl group and a (meth)acrylic copolymer. Furthermore, materials listed as examples below may be used singly or in combinations of two or more kinds thereof, unless otherwise specified. When a plurality of substances corresponding to each component exist in the composition, the content of each component in the composition means the total amount of the plurality of substances that exist in the composition, unless otherwise specified.

[Adhesive Set]

An adhesive set of an embodiment includes a main agent containing a decomplexing agent and an initiator containing an organoborane complex. In the adhesive set of the present embodiment, an adhesive composition containing the main agent and the initiator can be obtained by mixing the main agent and the initiator. According to such an adhesive set, by mixing the main agent and the initiator, an adhesive composition excellent in an adhesive strength can be prepared without use of a halogenated metal salt.

The main agent contains a decomplexing agent. The initiator contains an organoborane complex. At least one of the main agent and the initiator further contains a compound having a radically polymerizable group. At least one of the main agent and the initiator further contains a compound having a thiocarbonylthio structure. At least one of the main agent and the initiator may further contain any of a filler, a plasticizer, a cross-linking agent, and the like. Hereinafter, respective components will be described.

(Organoborane Complex)

The initiator contains an organoborane complex. The organoborane complex means an organoborane-Lewis base complex obtained by coordinating a Lewis base to organoborane to form a complex. The organoborane-Lewis base complex is a compound that reacts with a decomplexing agent described below to provide organoborane. Since the organoborane causes radical cleavage in an oxygen atmosphere to generate a borinate radical or the like serving as a dormant species, the organoborane may act as an initiator of living radical polymerization. The organoborane may be, for example, alkylborane ($BR_3$, R: alkyl group). The Lewis base may be, for example, amine. The amine may be, for example, a compound having a plurality of amino groups, or a compound having at least an amino group constituting amine and a group (for example, an alkoxy group or the like) containing an atom (for example, an oxygen atom or the like) capable of coordinating to boron other than the nitrogen atom of the amino group. These compounds act as a multidentate ligand with respect to organoborane, and thus can be regarded as multidentate amine.

The organoborane complex may be an alkylborane-amine complex, and may be an alkylborane-multidentate amine complex. Examples of the organoborane complex contain a triethylborane-1,3-diaminopropane complex, a triethylborane-diethylene triamine complex, a tri-n-butylborane-3-methoxy-1-propylamine complex, a tri-n-butylborane-1,3-diaminopropane complex, a triisobutylborane-1,3-diaminopropane complex, a triethylborane-1,6-diaminohexane complex, a triisobutylborane-1,3-diaminopropane complex, and a triisobutylborane-1,6-diaminohexane complex. These may be used singly or may be used in combination of two or more kinds thereof. Among these, the organoborane complex may be a triethylborane-1,3-diaminopropane complex or a tri-n-butylborane-3-methoxy-1-propylamine complex. As the organoborane complex, a commercially available product or a synthetic product may be used.

The content of the organoborane complex may be 0.1% by mass or more, 1% by mass or more, 3% by mass or more, or 5% by mass or more, on the basis of the total amount of the initiator, from the viewpoint of producing adhesive strength. The content of the organoborane complex may be 30% by mass or less, 20% by mass or less, 15% by mass or less, or 10% by mass or less, on the basis of the total amount of the initiator, from the viewpoint of storage stability.

The content of the organoborane complex may be 0.01% by mass or more, 0.05% by mass or more, 0.1% by mass or more, or 0.2% by mass or more, on the basis of the total amount of the main agent and the initiator, from the viewpoint of producing adhesive strength. The content of the organoborane complex may be 10% by mass or less, 5% by mass or less, 3% by mass or less, or 1% by mass or less, on the basis of the total amount of the main agent and the initiator, from the viewpoint of toughness of an adhesive layer.

The content of the organoborane complex may be 0.01 mol % or more, 0.1 mol % or more, 0.3 mol % or more, or 0.5 mol % or more, on the basis of the total amount of the compound having a radically polymerizable group, from the viewpoint of producing adhesive strength. The content of the organoborane complex may be 10 mol % or less, 6 mol % or less, 4 mol % or less, or 2 mol % or less, on the basis of the total amount of the compound having a radically polymerizable group, from the viewpoint of toughness of an adhesive layer.

(Decomplexing agent)

The main agent contains a decomplexing agent. The decomplexing agent is a compound that dissociate a Lewis base in the organoborane complex (organoborane-Lewis base complex) so that organoborane can be generated. Therefore, the organoborane complex contained in the initiator and the decomplexing agent contained in the main agent are mixed to react with each other so that organoborane, which may be an initiator of living radical polymerization, can be generated.

Examples of the decomplexing agent include an acid, an acid anhydride, an aldehyde, and a β-ketone compound. These may be used singly or may be used in combination of two or more kinds thereof. Examples of the acid include Lewis acids such as $SnCl_4$ and $TiCl_4$ and Brønsted acids such as aliphatic carboxylic acid and aromatic carboxylic acid. Examples of the acid anhydride include acetic anhydride, propionic anhydride, succinic anhydride, maleic anhydride, and phthalic anhydride. Examples of the aldehyde include benzaldehyde, o-, m-, and p-nitrobenzaldehydes. Examples of the β-ketone compound include methyl acetoacetate, ethyl acetoacetate, t-butyl acetoacetate, and 2-methacryloyloxyethyl acetoacetate. Among these, the decomplexing agent may be an acid anhydride from the viewpoint of decomplexing reactivity between the decomplexing agent and the organoborane complex and storage stability of the initiator, and may be a succinic anhydride from the viewpoint of suppressing the blending mass of the decomplexing agent.

The content of the decomplexing agent may be 0.01% by mass or more, 0.1% by mass or more, or 0.3% by mass or more, on the basis of the total amount of the main agent, from the viewpoint of shortening the curing time until an adhesive layer is cured to express an adhesive strength. The content of the decomplexing agent may be 10% by mass or less, 5% by mass or less, 3% by mass or less, or 2% by mass or less, on the basis of the total amount of the main agent, from the viewpoint of securing an operation time from application of the adhesive composition to adherends to pasting the adherends to each other.

The content of the decomplexing agent may be 0.01% by mass or more, 0.1% by mass or more, 0.2% by mass or more, or 0.3% by mass or more, on the basis of the total amount of the main agent and the initiator, from the viewpoint of shortening the curing time until an adhesive layer is cured to express an adhesive strength. The content of the decomplexing agent may be 10% by mass or less, 7% by mass or less, 5% by mass or less, or 3% by mass or less, on the basis of the total amount of the main agent and the initiator, from the viewpoint of securing an operation time from application of the adhesive composition to adherends to pasting the adherends to each other.

The molar amount ratio of the decomplexing agent with respect to the organoborane complex (the molar amount of the decomplexing agent/the molar amount of the organoborane complex) may be, for example, 0.9 or more, 1 or more, 1.5 or more, or 2 or more. When the molar amount ratio is 1 or more, there is a tendency that a more sufficient adhesive strength is obtained. The molar amount ratio of the decomplexing agent with respect to the organoborane complex (the molar amount of the decomplexing agent/the molar amount of the organoborane complex) may be, for example, 50 or less, 30 or less, 10 or less, 7 or less, 5 or less, or 3 or less. As the molar amount ratio is decreased, there is a tendency that an operation time from application of the adhesive composition to adherends to pasting the adherends to each other can be more sufficiently secured.

(Compound Having Radically Polymerizable Group)

At least one of the main agent and the initiator further contains a compound having a radically polymerizable group. The compound having a radically polymerizable group is a compound having a polymerizable group that reacts by radicals. Examples of the radically polymerizable group include a (meth)acryloyl group, a vinyl group, an allyl group, a styryl group, an alkenyl group, an alkenylene group, and a maleimide group.

The compound having a radically polymerizable group may contain, for example, a compound having a (meth) acryloyl group. Examples of the compound having a (meth) acryloyl group include a monofunctional (meth)acrylate having one (meth)acryloyl group, a polyfunctional (meth) acrylate having two or more (meth)acryloyl groups, and a (meth)acrylamide derivative.

Examples of the monofunctional (meth)acrylate include (meth)acrylic acid; alkyl (meth)acrylates having an alkyl group such as methyl (meth)acrylate, ethyl (meth)acrylate, n-butyl (meth)acrylate, isobutyl (meth)acrylate, tert-butyl (meth)acrylate, n-pentyl (meth)acrylate, n-hexyl (meth) acrylate, n-octyl (meth)acrylate, isooctyl (meth)acrylate, 2-ethylhexyl (meth)acrylate, isodecyl (meth)acrylate, dodecyl (meth)acrylate (n-lauryl (meth)acrylate), isomyristyl (meth)acrylate, stearyl (meth)acrylate, and isostearyl acrylate; alkenyl (meth)acrylates having an alkenyl group such as 3-butenyl (meth)acrylate; (meth)acrylates having an aromatic group such as benzyl (meth)acrylate and phenoxyethyl (meth)acrylate; alkoxy polyalkylene glycol (meth) acrylates such as methoxy tetraethylene glycol (meth)acrylate, methoxy hexaethylene glycol (meth)acrylate, methoxy octaethylene glycol (meth)acrylate, methoxy nonaethylene glycol (meth)acrylate, methoxy polyethylene glycol (meth) acrylate, methoxy heptapropylene glycol (meth)acrylate, ethoxy tetraethylene glycol (meth)acrylate, butoxy ethylene glycol (meth)acrylate, and butoxy diethylene glycol (meth) acrylate; (meth)acrylates having an alicyclic group such as cyclohexyl (meth)acrylate, isobornyl (meth)acrylate, and dicyclopentanyl (meth)acrylate; (meth)acrylates having a hydroxyl group such as 2-hydroxyethyl (meth)acrylate, 3-hydroxypropyl (meth)acrylate, and 4-hydroxybutyl (meth) acrylate; (meth)acrylates having an amino group such as N,N-dimethylaminoethyl (meth)acrylate; (meth)acrylates having an isocyanate group such as 2-(2-methacryloyloxyethyloxy)ethyl isocyanate and 2-(meth)acryloyloxy ethyl isocyanate; polyalkylene glycol mono(meth)acrylates such as tetraethylene glycol mono(meth)acrylate, hexaethylene glycol mono(meth)acrylate, octapropylene glycol mono (meth)acrylate, dipropylene glycol mono(meth)acrylate, tripropylene glycol mono(meth)acrylate, and octapropylene glycol mono(meth)acrylate; and (meth)acrylates having a siloxane skeleton. These may be used singly or may be used in combination of two or more kinds thereof.

Examples of the polyfunctional (meth)acrylate include aliphatic (meth)acrylates such as ethylene glycol di(meth) acrylate, diethylene glycol di(meth)acrylate, triethylene glycol di(meth)acrylate, tetraethylene glycol di(meth)acrylate, polyethylene glycol di(meth)acrylate, propylene glycol di(meth)acrylate, dipropylene glycol di(meth)acrylate, tripropylene glycol di(meth)acrylate, tetrapropylene glycol di(meth)acrylate, polypropylene glycol di(meth)acrylate, ethoxylated polypropylene glycol di(meth)acrylate, 1,3-butanediol di(meth)acrylate, 1,4-butanediol di(meth)acrylate, neopentyl glycol di(meth)acrylate, 3-methyl-1,5-pentanediol di(meth)acrylate, 1,6-hexanediol di(meth)acrylate, 2-butyl-2-ethyl-1,3-propanediol di(meth)acrylate, 1,9-nonanediol di(meth)acrylate, 1,10-decanediol di(meth)acrylate, glycerin di(meth)acrylate, tricyclodecanedimethanol (meth)acrylate, and ethoxylated 2-methyl-1,3-propanediol di(meth)acrylate; aromatic (meth)acrylates such as ethoxylated bisphenol A type di(meth)acrylate, propoxylated bisphenol A type di(meth)acrylate, ethoxylated propoxylated bisphenol A type di(meth)acrylate, ethoxylated bisphenol F type di(meth)acrylate, propoxylated bisphenol F type di(meth)acrylate, ethoxylated propoxylated bisphenol F type di(meth)acrylate, ethoxylated fluorene type di(meth)acrylate, propoxylated fluorene type di(meth)acrylate, and ethoxylated propoxylated fluorene type di(meth)acrylate; and aromatic epoxy (meth)acrylates such as bisphenol type epoxy (meth)acrylate, phenol novolac type epoxy (meth) acrylate, and cresol novolac type epoxy (meth)acrylate. These may be used singly or may be used in combination of two or more kinds thereof.

Examples of the (meth)acrylamide derivative include N,N-dimethylaminopropyl (meth)acrylamide, N,N-dimethyl (meth)acrylamide, N-isopropyl (meth)acrylamide, N,N-diethyl (meth)acrylamide, N-hydroxyethyl (meth)acrylamide, and (meth)acryloyl morpholine. These may be used singly or may be used in combination of two or more kinds thereof.

The compound having a radically polymerizable group may contain, in addition to the compound having a (meth) acryloyl group, for example, a copolymer compound copolymerizable therewith. Examples of the copolymer compound include compounds having a radically polymerizable group other than the (meth)acryloyl group such as styrene, 4-methylstyrene, vinylpyridine, vinylpyrrolidone, vinyl acetate, cyclohexylmaleimide, phenylmaleimide, and maleic anhydride.

The compound having a radically polymerizable group may be contained in at least one of the main agent and the initiator, and for example, the main agent may contain the compound having a radically polymerizable group.

The content of the compound having a radically polymerizable group may be 40% by mass or more, 50% by mass or more, 60% by mass or more, or 70% by mass or more, on the basis of the total amount of the main agent and the initiator, from the viewpoint of improving toughness of an adhesive layer and improving an adhesive strength. The content of the compound having a radically polymerizable group may be 99% by mass or less, 98% by mass or less, 95% by mass or less, or 93% by mass or less, on the basis of the total amount of the main agent and the initiator, from the viewpoint of suppressing sagging of the applied adhesive composition and suppressing a decrease in toughness of an adhesive layer.

(Compound Having Thiocarbonylthio Structure)

At least one of the main agent and the initiator further contains a compound having a thiocarbonylthio structure. The compound having a thiocarbonylthio structure is a compound having a structure represented by Formula (1) below (or Formula (2) below). The compound having a thiocarbonylthio structure can be used without particular limitations as long as it is a compound having such a structure, and for example, a chain transfer agent (RAFT agent) that is used in the field of RAFT polymerization (Reversible Addition/Fragmentation Chain Transfer) can be suitably used.

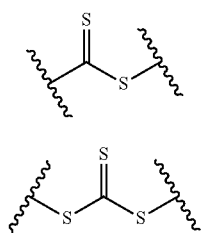

(1)

(2)

The compound having a thiocarbonylthio structure may be, for example, a compound having a structure represented by Formula (1a) below (or Formula (2a) below).

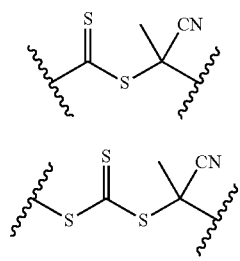

(1a)

(2a)

Examples of the compound having the structure represented by Formula (1a) (or Formula (2a)) include the following compounds (1a-1), (2a-1), and (2a-2).

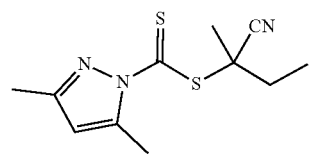

(1a-1)

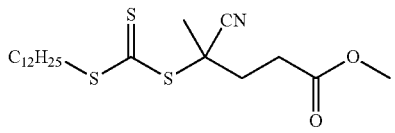

(2a-1)

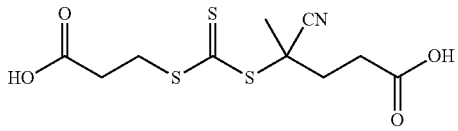

(2a-2)

The compound having a thiocarbonylthio structure may be contained in at least one of the main agent and the initiator, and for example, the main agent may contain the compound having a thiocarbonylthio structure.

The content of the compound having a thiocarbonylthio structure may be 0.01% by mass or more, 0.02% by mass or more, 0.03% by mass or more, or 0.05% by mass or more, on the basis of the total amount of the main agent and the initiator, from the viewpoint of securing an operation time from application of the adhesive composition to adherends to pasting the adherends to each other and improving an adhesive strength. The content of the compound having a thiocarbonylthio structure may be 5% by mass or less, 3% by mass or less, 1% by mass or less, or 0.5% by mass or less, on the basis of the total amount of the main agent and the initiator, from the viewpoint of storage stability of the main agent.

The content of the compound having a thiocarbonylthio structure may be 0.01 mol % or more, 0.03 mol % or more, 0.05 mol % or more, or 0.1 mol % or more, on the basis of the total amount of the compound having a radically polymerizable group, from the viewpoint of securing an operation time from application of the adhesive composition to adherends to pasting the adherends to each other and improving an adhesive strength. The content of the compound having a thiocarbonylthio structure may be 5 mol % or less, 3 mol % or less, 1 mol % or less, or 0.7 mol % or less, on the basis of the total amount of the compound having a radically polymerizable group, from the viewpoint of storage stability of the main agent.

(Filler)

The filler may be, for example, any of an inorganic filler and an organic filler. Examples of the inorganic filler include inorganic fine particles such as silica, alumina, silica-alumina, titania, zirconia, magnesia, kaolin, talc, calcium carbonate, bentonite, mica, sericite, glass flakes, glass fibers, graphite, magnesium hydroxide, aluminum hydroxide, antimony trioxide, barium sulfate, zinc borate, wollastonite, xonotlite, and whisker. Examples of the organic filler include organic fine particles such as silicone, acrylic silicone, MBS (methacrylate-butadiene-styrene), polyimide, and polyimide. These fillers (fine particles) may have a uniform structure, and may have a core-shell type structure.

The content of the filler may be 0.1% by mass or more, 0.2% by mass or more, or 0.3% by mass or more and may be 40% by mass or less, 30% by mass or less, or 30% by mass or less, on the basis of the total amount of the main agent and the initiator.

(Plasticizer)

Examples of the plasticizer include a phthalic acid ester-based compound, an alkyl sulfonic acid ester-based compound, and an adipic acid ester-based compound.

The content of the plasticizer may be 0.1% by mass or more, 1% by mass or more, or 3% by mass or more and may be 30% by mass or less, 20% by mass or less, or 10% by mass or less, on the basis of the total amount of the main agent and the initiator.

(Cross-Linking Agent)

Examples of the cross-linking agent include an aziridine-based cross-linking agent and a carbodiimide-based cross-linking agent.

The content of the cross-linking agent may be 0.01% by mass or more, 0.1% by mass or more, or 0.5% by mass or more and may be 5% by mass or less, 3% by mass or less, or 2% by mass or less, on the basis of the total amount of the main agent and the initiator.

At least one of the main agent and the initiator may further contain an ultraviolet absorbing agent, a dehydrating agent, a pigment, a dye, an age resister, an antioxidant, an antistatic agent, a flame retardant, an adhesion imparting agent, a dispersant, a solvent, and the like, in addition to the above-described components.

In the adhesive set of the present embodiment, an adhesive composition can be prepared by mixing the main agent and the initiator. The temperature when the main agent and the initiator are mixed may be, for example, 10 to 35° C. The pot life of the adhesive set may be, for example, 0.1 to 3 minutes.

In the case of mixing the main agent and the initiator, the main agent and the initiator are preferably mixed so that the molar amount ratio of the decomplexing agent in the main agent with respect to the organoborane complex in the initiator (the molar amount of the decomplexing agent/the molar amount of the organoborane complex) is 0.9 or more, 1 or more, 1.5 or more, or 2 or more or is 50 or less, 30 or less, 10 or less, 7 or less, 5 or less, or 3 or less.

In the case of mixing the main agent and the initiator, the main agent and the initiator are preferably mixed so that the mass ratio of the main agent with respect to the initiator (the mass of the main agent/the mass of the initiator) is, for example, 1 or more, 3 or more, or 5 or more or is 200 or less, 100 or less, or 50 or less.

A method of mixing the main agent and the initiator is not particularly limited as long as both the main agent and the initiator are mixed, and examples thereof include a manual mixing method, a mixing method with hand painting using a usual caulking gun, and a mixing method using a mechanical rotary mixer, a static mixer, or the like while concurrently using a quantitative pump for feeding a raw material (for example, a gear pump, a plunger pump, or the like) and a throttle valve.

The adhesive composition thus prepared can form an adhesive layer by applying the adhesive composition to a predetermined place. The adhesive layer thus formed acts as an adhesive layer bonding both base materials to each other since the molecular weight of the compound having a radically polymerizable group is gradually increased and the compound is cured. As the method of applying the adhesive composition to a predetermined place, a conventionally known method such as a method using a dispenser or the like can be applied.

The conditions under which the adhesive composition is cured may be, for example, a curing temperature of 10 to 35° C. and a curing time of 24 to 96 hours.

[Adhesive Body and Manufacturing Method Therefor]

An adhesive body of an embodiment includes a first adherend, a second adherend, and an adhesive layer bonding the first adherend and the second adherend to each other. The adhesive layer contains a cured product of an adhesive composition containing the main agent and the initiator of the above-described adhesive set.

Examples of the first adherend and the second adherend include plastic substrates such as polypropylene (PP), polyvinyl chloride, an acrylonitrile/butadiene/styrene copolymer (ABS), polycarbonate (PC), polyamide (PA), polymethylmethacrylate (PMMA), polyester, an epoxy resin, polyurethane (PUR), polyoxymethylene (POM), polyethylene (PE), an ethylene/propylene copolymer (EPM), and an ethylene/propylene/diene polymer (EPDM), and metal substrates such as aluminum, steel, copper, and stainless steel.

Examples of the adhesive body include plastic laminate substrates, metal laminate substrates, electronic components, semiconductor components, and display components.

A method for manufacturing the adhesive body of an embodiment includes pasting the first adherend and the second adherend together with the adhesive composition containing the main agent and the initiator. The temperature when the main agent and the initiator of the adhesive set are mixed, the conditions under which the adhesive composition is cured, and the like may be the same as described above.

EXAMPLES

Hereinafter, the present disclosure will be more specifically described by reference to Examples. However, the present disclosure is not limited to these Examples.

Examples 1 to 10

[Production of Adhesive Set]
(Preparation of Raw Materials)
Organoborane Complex TEB-DAP: triethylborane-1,3-diaminopropane complex (molecular weight: 172.1, KISHIDA CHEMICAL Co., Ltd.)

TnBB-MOPA: tri-n-butylborane-3-methoxy-1-propylamine complex (molecular weight: 271.3, KISHIDA CHEMICAL Co., Ltd.)

Decomplexing Agent

Succinic anhydride (molecular weight: 100.1, FUJIFILM Wako Pure Chemical Corporation)

Compound Having a Radically Polymerizable Group (Polymerizable Compound)

FA-513AS: dicyclopentanyl acrylate (molecular weight: 206.3, Showa Denko Materials Co., Ltd.)

FA-310A: phenoxyethyl acrylate (molecular weight: 192.2, Showa Denko Materials Co., Ltd.)

Compound Having a Thiocarbonylthio Structure (Polymerization Control Agent)

CTA1: 3,5-dimethylpyrazole-1-carbodithioic acid 2'-cyanobutane-2'-yl (compound (1a-1), molecular weight: 253.4, FUJIFILM Wako Pure Chemical Corporation)

CTA2: 4-cyano-4-[(dodecylsulfanylthiocarbonyl)sulfanyl]methyl pentanoate (compound (2a-1), molecular weight: 417.7, FUJIFILM Wako Pure Chemical Corporation)

CTA3: 4-[(2-carboxyethylsulfanylthiocarbonyl)sulfanyl]-4-cyanopentanoic acid (compound (2a-2), molecular weight: 307.4, FUJIFILM Wako Pure Chemical Corporation)

Filler

RY200S: fumed silica (hydrophobic fumed silica surface-treated with silicone oil, NIPPON AEROSIL CO., LTD.)

R805: silica fine particles (hydrophobized silica particles surface-treated with octylsilane, NIPPON AEROSIL CO., LTD.)

M210: acrylic resin-based core-shell particles (KANEKA CORPORATION)

EZ-004: MB S-based core-shell particles (KANEKA CORPORATION)

B564: MBS-based core-shell particles (KANEKA CORPORATION)

Plasticizer

PN-5090: adipic acid polyester (ADEKA Corporation)

Cross-Linking Agent

Triaziridine: tris [3-(1-aziridinyl)propionic acid]trimethylol propane (FUJIFILM Wako Pure Chemical Corporation)

(Preparation of Main Agent)

The decomplexing agent, the compound having a radically polymerizable group, the compound having a thiocarbonylthio structure, and the filler were weighed out and placed in a plastic bottle according to types and ratios (unit: parts by mass) shown in Table 1, mixed using a rotation/revolution mixer (THINKY CORPORATION, Awatori Rentarou) for 15 minutes under the condition of 2000 revolutions/min, and further deaerated for 5 minutes under the condition of 2000 revolutions/min, thereby preparing each main agent of Examples 1 to 10.

(Preparation of Initiator)

The organoborane complex, the plasticizer, the cross-linking agent, and the filler were weighed out and placed in a plastic bottle according to types and ratios (unit: parts by mass) shown in Table 1, mixed using a rotation/revolution mixer (THINKY CORPORATION, Awatori Rentarou) for 15 minutes under the condition of 2000 revolutions/min, and further deaerated for 5 minutes under the condition of 2000 revolutions/min, thereby preparing each initiator of Examples 1 to 10.

[Measurement of Adhesive Strength]

A 0.5-mm spacer was disposed between two polypropylene substrates (adherends) (size: 100 mm×25 mm, thickness: 2 mm) so that the thickness of the adhesive layer was 0.5 mm. The main agent in each Example and the initiator in each Example were filled in a manual dispenser so as to mix the main agent and the initiator. The resultant mixture was applied to the portion between the polypropylene substrates using the manual dispenser, and the polypropylene substrates were pasted to each other to obtain a laminate. The laminate thus obtained was left to stand at 25° C. for 24 hours (or 96 hours) and cured, thereby producing an evaluation sample. The produced evaluation sample was subjected to a tensile test at a distance between chucks of 100 mm and a testing rate of 5 mm/min, and the shear strength (MPa) with respect to the polypropylene substrate was measured. When the shear strength is 1 MPa or more, it can be considered to have a sufficient adhesive strength. Results are shown in Table 1.

TABLE 1

|  |  |  | Exam. 1 | Exam. 2 | Exam. 3 | Exam. 4 | Exam. 5 |
|---|---|---|---|---|---|---|---|
| Main agent | Decomplexing agent | Succinic anhydride | 1.02 | 1.01 | 0.98 | 0.98 | 0.71 |
|  | Polymerizable compound | FA-513AS | 46.59 | 45.78 | 44.36 | 44.23 | 40.65 |
|  |  | FA-310A | 43.75 | 42.99 | 41.65 | 41.32 | 40.66 |
|  | Polymerization control agent | CTA1 | 0.26 | 0.31 | — | — | — |
|  |  | CTA2 | — | — | 0.42 | — | — |
|  |  | CTA3 | — | — | — | 0.32 | 0.23 |
|  | Filler | RY200S | 8.38 | 9.91 | — | — | — |
|  |  | R805 | — | — | 12.59 | 13.15 | — |
|  |  | M210 | — | — | — | — | 17.75 |
| Total amount of main agent |  |  | 100.00 | 100.00 | 100.00 | 100.00 | 100.00 |
| Initiator | Organoborane complex | TEB-DAP | 0.80 | 0.69 | 0.69 | 0.72 | 0.59 |
|  |  | TnBB-MOPA | — | — | — | — | — |
|  | Plasticizer | PN-5090 | 6.28 | 6.49 | 6.50 | 8.17 | 7.94 |
|  | Cross-linking agent | Triaziridine | 1.23 | 1.11 | 1.10 | 1.11 | 1.11 |
|  | Filler | EZ-004 | 1.70 | — | 1.70 | — | — |
|  |  | B564 | — | 1.70 | — | — | — |
|  |  | RY200S | — | — | — | — | 0.36 |
| Total amount of initiator |  |  | 10.0 | 10.0 | 10.0 | 10.0 | 10.0 |
| Molar amount of decomplexing agent/molar amount of organoborane complex |  |  | 2.2 | 2.5 | 2.4 | 2.3 | 2.1 |
| Mass of main agent/mass of initiator |  |  | 10.0 | 10.0 | 10.0 | 10.0 | 10.0 |
| Shear strength (after 24 hours) [MPa] |  |  | 4.27 | 3.29 | 2.35 | 2.82 | 3.49 |

|  |  |  | Exam. 6 | Exam. 7 | Exam. 8 | Exam. 9 | Exam. 10 |
|---|---|---|---|---|---|---|---|
| Main agent | Decomplexing agent | Succinic anhydride | 0.70 | 10.42 | 1.72 | 0.70 | 0.34 |
|  | Polymerizable compound | FA-513AS | 40.67 | 196.38 | 40.26 | 40.67 | 40.47 |
|  |  | FA-310A | 40.66 | 210.74 | 40.25 | 40.66 | 40.48 |
|  | Polymerization control agent | CTA1 | 0.21 | — | — | 0.21 | — |
|  |  | CTA2 | — | — | — | — | — |
|  |  | CTA3 | — | 0.24 | 0.22 | — | 0.20 |
|  | Filler | RY200S | — | — | — | — | — |
|  |  | R805 | — | — | — | — | — |
|  |  | M210 | 17.76 | 17.70 | 17.55 | 17.76 | 18.52 |
| Total amount of main agent |  |  | 100.00 | 435.48 | 100.00 | 100.00 | 100.00 |
| Initiator | Organoborane complex | TEB-DAP | 0.59 | 0.59 | 0.59 | — | 0.59 |
|  |  | TnBB-MOPA | — | — | — | 0.95 | — |

TABLE 1-continued

|  |  |  |  |  |  |  |
|---|---|---|---|---|---|---|
| Plasticizer | PN-5090 | 7.94 | 7.94 | 7.94 | 7.56 | 7.94 |
| Cross-linking agent | Triaziridine | 1.11 | 1.11 | 1.11 | 1.12 | 1.11 |
| Filler | EZ-004 | — | — | — | — | — |
|  | B564 | — | — | — | — | — |
|  | RY200S | 0.36 | 0.36 | 0.36 | 0.36 | 0.36 |
| Total amount of initiator |  | 10.0 | 10.0 | 10.0 | 10.0 | 10.0 |
| Molar amount of decomplexing agent/molar amount of organoborane complex |  | 2.0 | 30.2 | 5.0 | 2.0 | 1.0 |
| Mass of main agent/mass of initiator |  | 10.0 | 43.5 | 10.0 | 10.0 | 10.0 |
| Shear strength (after 24 hours) [MPa] |  | 3.79 | 3.20 | 3.02 | 3.63* | 1.74 |

*Shear strength (after 96 hours)

As shown in Table 1, the adhesive composition prepared from each of the adhesive sets of Examples 1 to 10 was excellent in a sufficient adhesive strength. From these results, it was confirmed that the adhesive set of the present disclosure enables an adhesive composition excellent in an adhesive strength to be prepared without use of a halogenated metal salt.

The invention claimed is:

1. A two part adhesive comprising:
a first part comprising a decomplexing agent; and
a second part comprising an initiator, the initiator comprising an organoborane complex, wherein
at least one of the first part and the second part further comprises a first compound having a radically polymerizable group, and
at least one of the first part and the second part further comprises a second compound having a thiocarbonylthio structure.

2. The two part adhesive according to claim 1, wherein the first part comprises the second compound having the thiocarbonylthio structure.

3. The two part adhesive according to claim 2, wherein the first part comprises the first compound having the radically polymerizable group.

4. The two part adhesive according to claim 3, wherein the first part further comprises a filler.

5. The two part adhesive according to claim 1, wherein the second part further comprises a filler, a cross-linking agent, and a plasticizer.

6. The two part adhesive according to claim 1, wherein both parts of the two part adhesive are free of any halogenated metal salt.

7. An adhesive composition consisting essentially of:
a decomplexing agent;
an organoborane complex;
a compound having a radically polymerizable group;
a compound having a thiocarbonylthio structure;
a filler;
a cross-linking agent; and
a plasticizer.

8. An adhesive body comprising:
a first adherend;
a second adherend; and
an adhesive layer interposed between the first adherend and the second adherend, the adhesive layer bonding the first adherend and the second adherend to each other, wherein
the adhesive layer comprises a cured product of an adhesive composition comprising the first part and the second part of the two part adhesive according to claim 1.

9. A method for manufacturing the adhesive body according to claim 8, the method comprising:
pasting the first adherend and the second adherend together with the adhesive composition comprising the first part and the second part.

* * * * *